(12) United States Patent
Chang

(10) Patent No.: US 11,928,388 B2
(45) Date of Patent: Mar. 12, 2024

(54) VEHICLE SOUND SERVICE SYSTEM AND METHOD THEREOF

(71) Applicants: Hyundai Motor Company, Seoul (KR); Kia Corporation, Seoul (KR)

(72) Inventor: Kyoung Jin Chang, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/708,826

(22) Filed: Mar. 30, 2022

(65) Prior Publication Data

US 2023/0129087 A1 Apr. 27, 2023

(30) Foreign Application Priority Data

Oct. 27, 2021 (KR) .................. 10-2021-0144885

(51) Int. Cl.
*G06F 3/16* (2006.01)
*B60Q 9/00* (2006.01)
*G06V 10/40* (2022.01)
*G06V 10/74* (2022.01)
*G06V 10/82* (2022.01)
*G06V 20/56* (2022.01)
*H04R 3/00* (2006.01)

(52) U.S. Cl.
CPC ............... *G06F 3/165* (2013.01); *B60Q 9/00* (2013.01); *G06V 10/40* (2022.01); *G06V 10/761* (2022.01); *G06V 10/82* (2022.01); *G06V 20/56* (2022.01); *H04R 3/00* (2013.01); *H04R 2499/13* (2013.01)

(58) Field of Classification Search
CPC ......... G06F 3/165; G06F 3/16; G06V 10/761; G06V 10/40; G06V 10/82; G06V 20/56; B60Q 9/00; H04R 3/00
See application file for complete search history.

(56) References Cited

U.S. PATENT DOCUMENTS

| 10,330,787 B2 | 6/2019 | Melvin et al. | |
| 10,511,911 B2* | 12/2019 | Kim | B60Q 9/00 |
| 10,671,865 B2 | 6/2020 | Kim | |
| 11,202,150 B1* | 12/2021 | Hoover | G06V 40/10 |
| 11,453,365 B2* | 9/2022 | Julian | H04L 67/06 |

(Continued)

FOREIGN PATENT DOCUMENTS

| KR | 2016-0051922 A | 5/2016 |
| KR | 2018-0094725 A | 8/2018 |

(Continued)

*Primary Examiner* — Olisa Anwah
(74) *Attorney, Agent, or Firm* — Fox Rothschild LLP

(57) ABSTRACT

A vehicle sound service system and a method thereof are provided. The vehicle sound service system includes a service server including a communication device that may be configured to transmit and receive data with a mobile terminal loaded with a camera and a processing device electrically connected with the communication device. The processing device may be configured to receive an image transmitted from the mobile terminal using the communication device, when the mobile terminal captures the image around a vehicle using the camera and transmits the image, to analyze the received image to estimate a driving place, and to select a sound that matches the estimated driving place and transmits the selected sound to the mobile terminal.

18 Claims, 6 Drawing Sheets

(56) References Cited

U.S. PATENT DOCUMENTS

| | | | |
|---|---|---|---|
| 2004/0263647 A1* | 12/2004 | Yamaguchi | G07C 5/085 |
| | | | 348/148 |
| 2011/0243454 A1* | 10/2011 | Miyajima | G01C 21/1656 |
| | | | 702/94 |
| 2012/0102066 A1* | 4/2012 | Eronen | G06F 16/58 |
| | | | 707/769 |
| 2016/0125077 A1 | 5/2016 | Jung et al. | |
| 2018/0232585 A1 | 8/2018 | Kim | |
| 2018/0267971 A1* | 9/2018 | Chou | G06F 16/438 |
| 2019/0052967 A1 | 2/2019 | Kim et al. | |
| 2022/0283773 A1 | 9/2022 | Chang et al. | |

FOREIGN PATENT DOCUMENTS

| | | |
|---|---|---|
| KR | 2019-0017411 A | 2/2019 |
| KR | 10-2022-0123862 A | 9/2022 |

\* cited by examiner

VEHICLE SOUND SERVICE SYSTEM AND METHOD THEREOF

CROSS-REFERENCE TO RELATED APPLICATION

This application claims under 35 U.S.C. § 119(a) the benefit of Korean Patent Application No. 10-2021-0144885, filed in the Korean Intellectual Property Office on Oct. 27, 2021, the entire contents of which are incorporated herein by reference.

BACKGROUND

(a) Technical Field

Embodiments of the present disclosure relate to a vehicle sound service system and a method thereof.

(b) Description of the Related Art

A technology of providing a background sound during driving is applied to a vehicle. However, existing vehicles play and output a predetermined sound to a user, which may not provide a suitable sound in response to an environment around the vehicle which is traveling. Under circumstances where the vehicle provides a sound which does not harmonize with a surrounding environment while the vehicle is traveling, it may provide inconvenience to passengers in the vehicle.

SUMMARY

Embodiments of the present disclosure can solve the above-mentioned problems occurring in existing technologies while advantages achieved by the existing technologies are maintained intact.

An aspect of embodiments of the present disclosure provide a vehicle sound service system for capturing an environment around a vehicle using a camera of a mobile terminal, analyzing the captured image, and providing the vehicle with a sound suitable for a driving place and a method thereof.

The technical problems to be solved by the present disclosure are not limited to the aforementioned problems, and any other technical problems not mentioned herein will be clearly understood from the following description by those skilled in the art to which embodiments of the present disclosure pertain.

According to an aspect of embodiments of the present disclosure, a vehicle sound service system may include a service server including a communication device that transmits and receives data with a mobile terminal embedded with a camera and a processing device electrically connected with the communication device. The processing device may be configured to receive an image transmitted from the mobile terminal using the communication device. The processing device may also be configured to, when the mobile terminal captures the image around a vehicle using the camera and transmits the image, analyze the received image to estimate a driving place. The processing device may be further configured to select a sound that matches the estimated driving place. The processing device may be additionally configured to transmit the selected sound to the mobile terminal.

The processing device may be configured to extract an image feature from the received image using a visual convolutional neural network (CNN).

The processing device may be configured to allow the visual CNN to learn an image feature for each place using image samples for each place in advance.

The processing device may be configured to compare probability distributions between the extracted image feature and a feature of a sound effect stored in a database using a K nearest neighbor (KNN) algorithm or a Kullback-Leibler (Kl)-divergence algorithm and may also be configured to select a sound effect having a feature most similar to the extracted image feature based on the compared result.

The processing device may be configured to store a sound effect feature for each place by an audio CNN in the database in advance.

The processing device may be configured to compare probability distributions between the extracted image feature and a feature of background music stored in the database using the KNN algorithm or the Kl-divergence algorithm and may also be configured to select background music having a feature most similar to the extracted image feature based on the compared result.

The processing device may be configured to store a feature of background music for each place by hearing evaluation in the database in advance.

The processing device may be configured to adjust a sound selected based on a playback parameter and transmits the adjusted sound to the mobile terminal.

The playback parameter may include at least one of a playback interval, a playback time, or a playback period.

The mobile terminal may be configured to transmit the adjusted sound to a vehicle terminal such that the vehicle terminal plays and outputs the adjusted sound to the outside.

According to another aspect of embodiments of the present disclosure, a vehicle sound service method may include capturing, by a mobile terminal, an image around a vehicle using a camera embedded in the mobile terminal and transmitting, by the mobile terminal, the image. The method may further include receiving, by a processing device of a service server, the image transmitted from the mobile terminal using a communication device of service server. The method may additionally include analyzing, by a processing device, the received image to estimate a driving place. The method may also include selecting, by the processing device, a sound that matches the estimated driving place. The method may additionally include transmitting, by the processing device, the selected sound to the mobile terminal.

The estimating of the driving place may include extracting, by the processing unit, an image feature from the received image using a visual convolutional neural network (CNN).

The vehicle sound service method may further include allowing, by the processing unit, the visual CNN to learn an image feature for each driving place using image samples for each driving place in advance.

The selecting of the sound may include comparing, by the processing device, probability distributions between the extracted image feature with a feature of a sound effect stored in a database using a K nearest neighbor (KNN) algorithm or a Kullback-Leibler (Kl)-divergence algorithm and selecting, by the processing device, a sound effect having a feature most similar to the extracted image feature based on the compared result.

The vehicle sound service method may further include storing, by the processing device, a sound effect feature for each driving place by an audio CNN in the database in advance.

The selecting of the sound may include comparing, by the processing device, probability distributions between the extracted image feature with a feature of background music stored in the database using the KNN algorithm or the Kl-divergence algorithm and selecting, by the processing device, background music having a feature most similar to the extracted image feature based on the compared result.

The vehicle sound service method may further include storing, by the processing device, a feature of sound effect for each driving place by hearing evaluation in the database in advance.

The transmitting of the selected sound to the mobile terminal may include adjusting, by the processing device, the selected sound based on a playback parameter and transmitting, by the processing device, the adjusted sound to the mobile terminal.

The playback parameter may include at least one of a playback interval, a playback time, or a playback period.

The vehicle sound service method may further include receiving and transmitting, by the mobile terminal, the adjusted sound to a vehicle terminal and playing and outputting, by the vehicle terminal, the adjusted sound to the outside.

BRIEF DESCRIPTION OF THE DRAWINGS

The above and other objects, features and advantages of embodiments of the present disclosure will be more apparent from the following detailed description taken in conjunction with the accompanying drawings.

DETAILED DESCRIPTION

Figure 1:
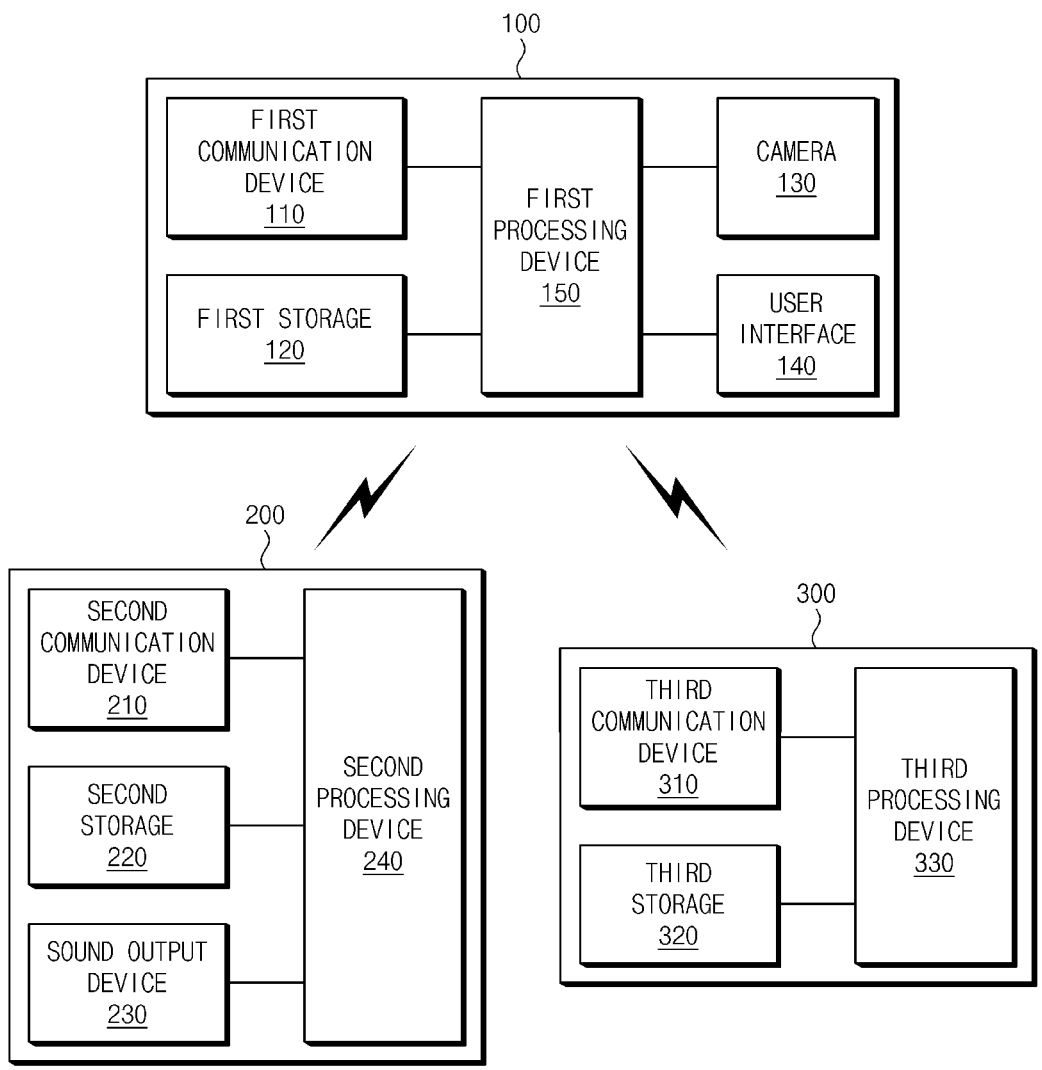
FIG. 1 is a block diagram illustrating a vehicle sound service system according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In the drawings, the same reference numerals will be used throughout to designate the same or equivalent elements.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a vehicle sound service system according to an embodiment of the present disclosure.

Referring to FIG. 1, the vehicle sound service system may include a mobile terminal 100, a vehicle terminal 200, and a service server 300.

The mobile terminal 100 may be an electronic device capable of being carried by a vehicle passenger and performing data communication, which may be a smartphone, a tablet, a laptop, and/or the like. The mobile terminal 100 may include a first communication device 110, a first storage 120, a camera 130, a user interface 140, and a first processing device 150.

The first communication device 110 may support wired communication or wireless communication between the mobile terminal 100 and an external electronic device (e.g., the vehicle terminal 200, the service server 300, and/or the like). The first communication device 110 may use at least one of a wired communication technology, such as auxiliary (AUX), local area network (LAN), wide area network (WAN), Ethernet, and/or integrated services digital network (ISDN), a wireless communication technology, such as wireless LAN (WLAN) (Wi-Fi®), wireless broadband (Wibro®), and/or world interoperability for microwave access (WiMAX®), short range communication, such as Bluetooth®, near field communication (NFC), radio frequency identification (RFID), infrared data association (IrDA®), ultra wideband (UWB), and/or ZigBee®, or a mobile communication technology, such as long term evolution (LTE), LTE-Advanced, and/or international mobile telecommunication (IMT)-2020. The first communication device 110 may include a communication processor, a communication circuit, an antenna, a transceiver, and/or the like.

The first storage 120 may store an image captured by the camera 130. The first storage 120 may store data (e.g., a sound) received through the first communication device 110. The first storage 120 may be a non-transitory storage medium which stores instructions executed by the first processing device 150. The first storage 120 may be implemented as at least one of storage media (or recording media) such as a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), and/or an erasable and programmable ROM (EPROM).

The camera 130 may be embedded in the mobile terminal 100 to obtain (e.g., capture) an image around the mobile terminal 100. The camera 130 may include at least one of image sensors such as a charge coupled device (CCD) image sensor, a complementary metal oxide semi-conductor (CMOS) image sensor, a charge priming device (CPD) image sensor, and/or a charge injection device (CID) image sensor. The camera 130 may include an image processor for preforming noise cancellation, color reproduction, file compression, image quality adjustment, and saturation adjustment for an image obtained by the image sensor.

The user interface 140 may be a device for interacting with a user, which may include an input device (e.g., a microphone, a keyboard, a touch pad, a switch, and/or the like), an output device (e.g., a display, a speaker, a touch screen, or the like), and the like. The input device may generate data (or a signal) according to manipulation of the user. The output device may output information (e.g., data, a signal, and/or the like), such as a progress situation and/or a progress result according to an operation of the first processing device 150, in the form of a visual signal, an audible signal, a tactile signal, and/or the like.

The first processing device 150 may be configured to control the overall operation of the mobile terminal 100. The first processing device 150 may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

While a vehicle is traveling, the first processing device 150 may be configured to capture an environment (an external environment) around the vehicle using the camera 130. In this case, the first processing device 150 may be configured to capture the external environment of the vehicle during driving in state where the mobile terminal 100 on which the camera 130 is mounted is held on the vehicle or where a passenger (e.g., a driver or a passenger) holds the mobile terminal 100 in his or her hand. The first processing device 150 may transmit the image captured by the camera 130 to the service server 300 through the first communication device 110.

The first processing device 150 may be configured to receive a sound (or a customized sound) suitable for (that matches) a driving place, which is transmitted from the service server 300, through the first communication device 110. The sound may include, but is not limited to, a sound effect, background music, and/or the like. The first processing device 150 may be configured to adjust (or process) the received sound based on a playback parameter (e.g., a playback interval, a playback time, a playback period, or the like). For example, the first processing device 150 may be configured to synthesize the sound effect with the background music based on the playback parameter to generate a sound (or an output sound) to be output. The first processing device 150 may be configured to transmit the adjusted sound to the vehicle terminal 200 through the first communication device 110.

The vehicle terminal 200 may be an electronic device capable of being installed in the vehicle and preforming data communication. Examples may include, but are not limited to, navigation devices, audio video navigation telematics (AVNT), infotainment devices, or the like. The vehicle terminal 200 may include a second communication device 210, a second storage 220, a sound output device 230, and a second processing device 240.

The second communication device 210 may be configured to support wired communication or wireless communication between the vehicle terminal 200 and an external electronic device (e.g., the mobile terminal 100, a global navigation satellite system (GNSS), and/or the like). Furthermore, the second communication device 210 may be configured to assist in performing communication between the vehicle terminal 200 and another electronic device (e.g., an electronic control unit (ECU) or the like) embedded in the vehicle. The second communication device 210 may be configured to use at least one of a vehicle communication technology (e.g., a controller area network (CAN), a media oriented systems transport (MOST) network, a local interconnect network (LIN), X-by-Wire (Flexray), and/or the like), a wired communication technology (e.g., AUX, LAN, Ethernet, ISDN, and/or the like), and/or a wireless communication technology (e.g., Wi-Fi®, Bluetooth®, NFC, RFID, IrDA®, LTE, IMT-2000, and/or the like). The second communication device 210 may include a communication processor, a communication circuit, an antenna, a transceiver, and/or the like.

The second storage 220 may be a storage medium which stores instructions executed by the second processing device 240. The second storage 220 may include at least one of storage media (or recording media) such as a flash memory, a hard disk, an SSD, an SD card, a RAM, an SRAM, a ROM, a PROM, an EEPROM, an EPROM, an embedded multimedia card (eMMC), and/or a universal flash storage (UFS).

The sound output device 230 may output the played sound to the outside. The sound output device 230 may include an amplifier, a speaker, and/or the like. The amplifier may be embedded in the vehicle and configured to amplify an electrical signal of the played sound. The speaker may be configured to convert the electrical signal amplified by the amplifier into a sound wave.

The second processing device 240 may be configured to receive a sound (or a sound source), which is transmitted from the mobile terminal 100, through the second communication device 210. The second processing device 240 may be configured to store the received sound in the second storage 220. The second processing device 240 may be configured to play the sound to output the sound to the sound output device 230. The second processing device 240 may be configured to control the overall operation of the vehicle terminal 200. The second processing device 240 may be implemented using at least one of processing devices such as ASICs, DSPs, DSPDs, PLDs, FPGAs, processors, microcontrollers, or microprocessors.

The service server 300 may be configured to analyze an image of a driving environment, which is captured by the camera 130 of the mobile terminal 100, to identify a driving place, and to select and provide a sound suitable for the identified driving place. The service server 300 may include a third communication device 310, a third storage 320, a third processing device 330, and the like.

The third communication device 310 may be configured to assist in performing wired communication or wireless communication between the service server 300 and an external electronic device (e.g., the mobile terminal 100 or the like). The third communication device 310 may be configured to use at least one of a wired communication technology (e.g., LAN, Ethernet, ISDN, and/or the like), and/or a wireless communication technology (e.g., Wi-Fi®, LTE, IMT-2000, and/or the like).

The third storage 320 may include a visual convolutional neural network (CNN) algorithm, an audio CNN algorithm, a score table, a sound source library, a K nearest neighbor (KNN) algorithm, a Kullback-Leibler (Kl)-divergence algorithm, and/or the like. The visual CNN algorithm may be configured to extract an image feature for each place from the image and to learn the image feature for each place using image samples of various places in advance. The audio CNN algorithm may be configured to extract a sound effect feature from audio data (or a sound) and to learn the sound effect feature for each place using sound effect samples for each place in advance.

Scores for pieces of background music for each place may be defined in the score table. As hearing evaluation for each of pieces of background music is performed with respect to a plurality of targets using various background music samples for each place, the background music score for each place may be determined as an average of the hearing evaluation result values (or scores). The third storage 320 may include a database which stores a sound effect feature for each place by the audio CNN and a database which stores a background music feature for each place by a hearing evaluation score table. The sound source library may store sound sources of various types of sound effects and background music.

The third storage 320 may be a storage medium which stores instructions executed by the third processing device 330. The third storage 320 may include at least one of storage media (or recording media) such as a flash memory, a hard disk, an SSD, an SD card, a RAM, an SRAM, a ROM, a PROM, an EEPROM, an EPROM, an embedded multimedia card (eMMC), and/or a universal flash storage (UFS).

The third processing device 330 may be configure to control the overall operation of the service server 300. The third processing device 330 may be implemented using at least one of ASICs, DSPs, DSPDs, PLDs, FPGAs, processors, microcontrollers, or microprocessors.

The third processing device 330 may be configured to receive an image, which is transmitted from the mobile terminal 100, through the third communication device 310. The third processing device 330 may be configured to extract a feature from the image using the visual CNN. The third processing device 330 may be configured to estimate a driving place based on the extracted image feature (or a feature of the driving place).

The third processing device 330 may be configured to select a sound, (e.g., a sound effect and/or background music), that is matched with the estimated driving place. The third processing device 330 may be configured to compare the extracted image feature with a sound feature stored in the database and to select a sound most similar to the extracted image feature. The third processing device 330 may be configured to compare probability distributions between the extracted image feature and the sound effect feature using the KNN algorithm, the Kl-divergence algorithm, or the like. The third processing device 330 may also be configured to select a sound effect having a feature most similar to a current image feature based on the compared result. Furthermore, the third processing device 330 may be configured to compare probability distributions between the extracted image feature and the sound effect feature using the KNN algorithm, the Kl-divergence algorithm, or the like and may be configured to select background music having a feature most similar to a current image feature based on the compared result. Because the Kl-divergence algorithm calculates a difference between probability distributions of both data and determines that pieces of data having the smallest difference are similar to each other, it may minimize cross entropy of data to calculate the most similar data.

The third processing device 330 may be configured to transmit the selected sound to the mobile terminal 100 using the third communication device 310. The third processing device 330 may be configured to extract a sound effect and background music selected as a sound suitable (matched) for the estimated driving place from the sound source library and may be configured to transmit the sound effect and the background music to the mobile terminal 100. In this case, the third processing device 330 may be configured to synthesize the sound effect and the background music selected based on a playback parameter (e.g., a playback interval, a playback time, a playback period, or the like) to make up a sound to be output and may transmit the made-up sound to the mobile terminal 100.

Figure 2:
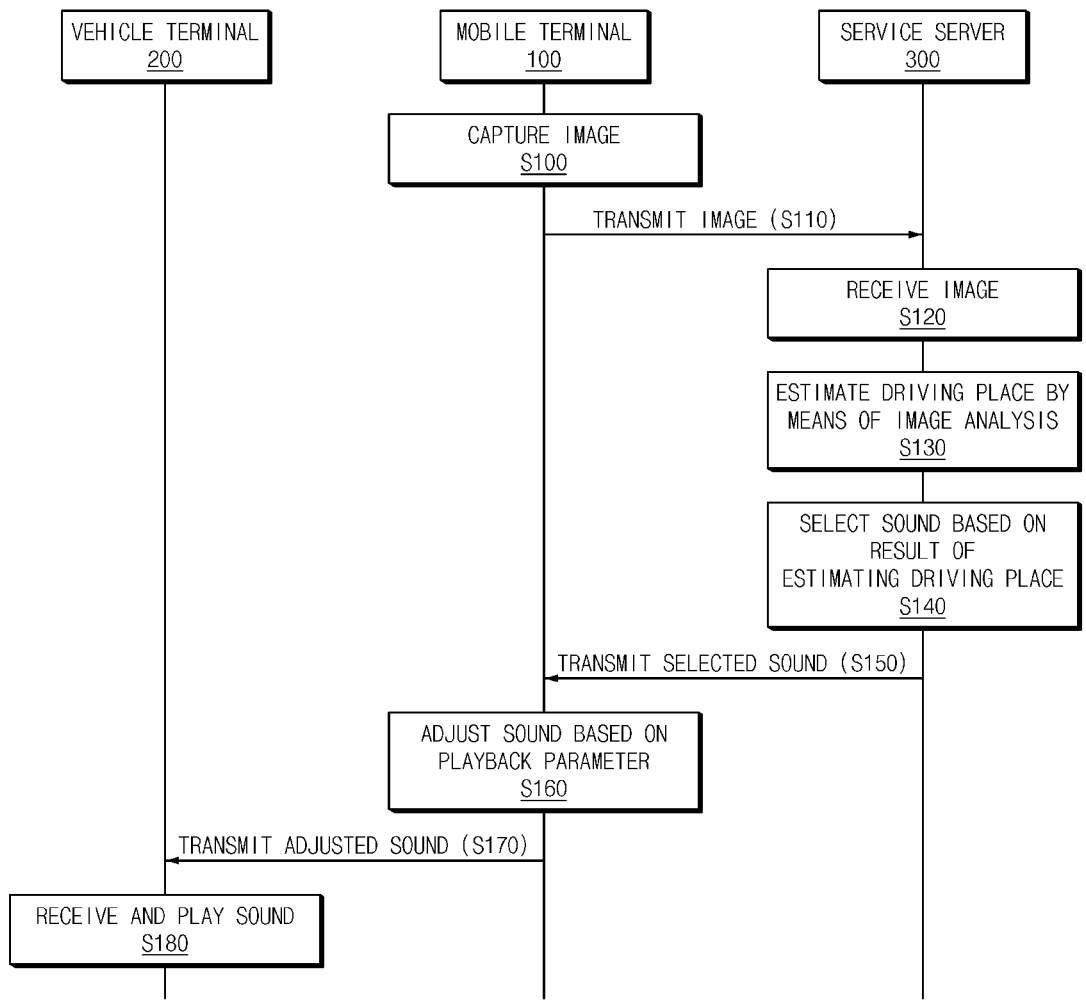
FIG. 2 is a signal sequence diagram illustrating a vehicle sound service method according to an embodiment of the present disclosure.

FIG. 2 is a signal sequence diagram illustrating a vehicle sound service method according to an embodiment of the present disclosure.

Referring to FIG. 2, in S100, a mobile terminal 100 may capture an image of an environment around a vehicle which is traveling using a camera 130 of FIG. 1. The mobile terminal 100 embedded with the camera 130 may be in a state where it is held on the vehicle or where a passenger holds it in hand.

In S110, the mobile terminal 100 may transmit the captured image to a service server 300 through a first communication device 110 of FIG. 1.

In S120, the service server 300 may receive the image, which is transmitted from the mobile terminal 100, through the third communication device 310 of FIG. 1. The service server 300 may store the received image in the third storage 320 of FIG. 1.

In S130, the service server 300 may analyze the received image to estimate a driving place. The service server 300 may extract a feature from the image using a visual CNN algorithm. The service server 300 may estimate the driving place based on the extracted image feature.

In S140, the service server 300 may select a sound based on the result of estimating the driving place. The service server 300 may compare the extracted image feature with a sound feature stored in a database and may select a sound most similar to the extracted image feature. The service server 300 may compare probability distributions between the extracted image feature and a sound effect feature using a KNN algorithm, a Kl-divergence algorithm, or the like and may select a sound effect having a feature most similar to a current image feature. Furthermore, the third processing device 330 may compare probability distributions between the extracted image feature and a background music feature using the KNN algorithm, the Kl-divergence algorithm, or the like and may select background music having a feature most similar to a current image feature.

In S150, the service server 300 may transmit the selected sound to the mobile terminal 100. The service server 300 may extract a sound effect and background music selected as a sound suitable for the estimated driving place from a sound source library and may transmit the sound effect and the background music to the mobile terminal 100.

In S160, the mobile terminal 100 may adjust the sound based on a playback parameter. The mobile terminal 100 may synthesize the sound effect and the background music selected based on the playback parameter (e.g., a playback interval, a playback time, a playback period, and the like) to generate a sound (or sound stream data).

In S170, the mobile terminal 100 may transmit the adjusted sound to a vehicle terminal 200. The mobile terminal 100 may transmit the sound composed of the selected sound effect and background music to the vehicle terminal 200.

In S180, the vehicle terminal 200 may play and output the sound provided from the mobile terminal 100. The vehicle terminal 200 may receive the sound, which is transmitted from the mobile terminal 100, through the second communication device 210 of FIG. 1. The vehicle terminal 200 may play and output the received sound to the sound output device 230 of FIG. 1.

In this embodiment, an example where the mobile terminal 100 makes up the sound to be output using the sound effect and the background music selected based on the playback parameter is presented. However, it may be understood that embodiments of the present disclosure are not limited thereto. The service server 300 may be implemented to make up the sound to be output using the sound effect and the background music selected based on the playback parameter.

Figure 3:
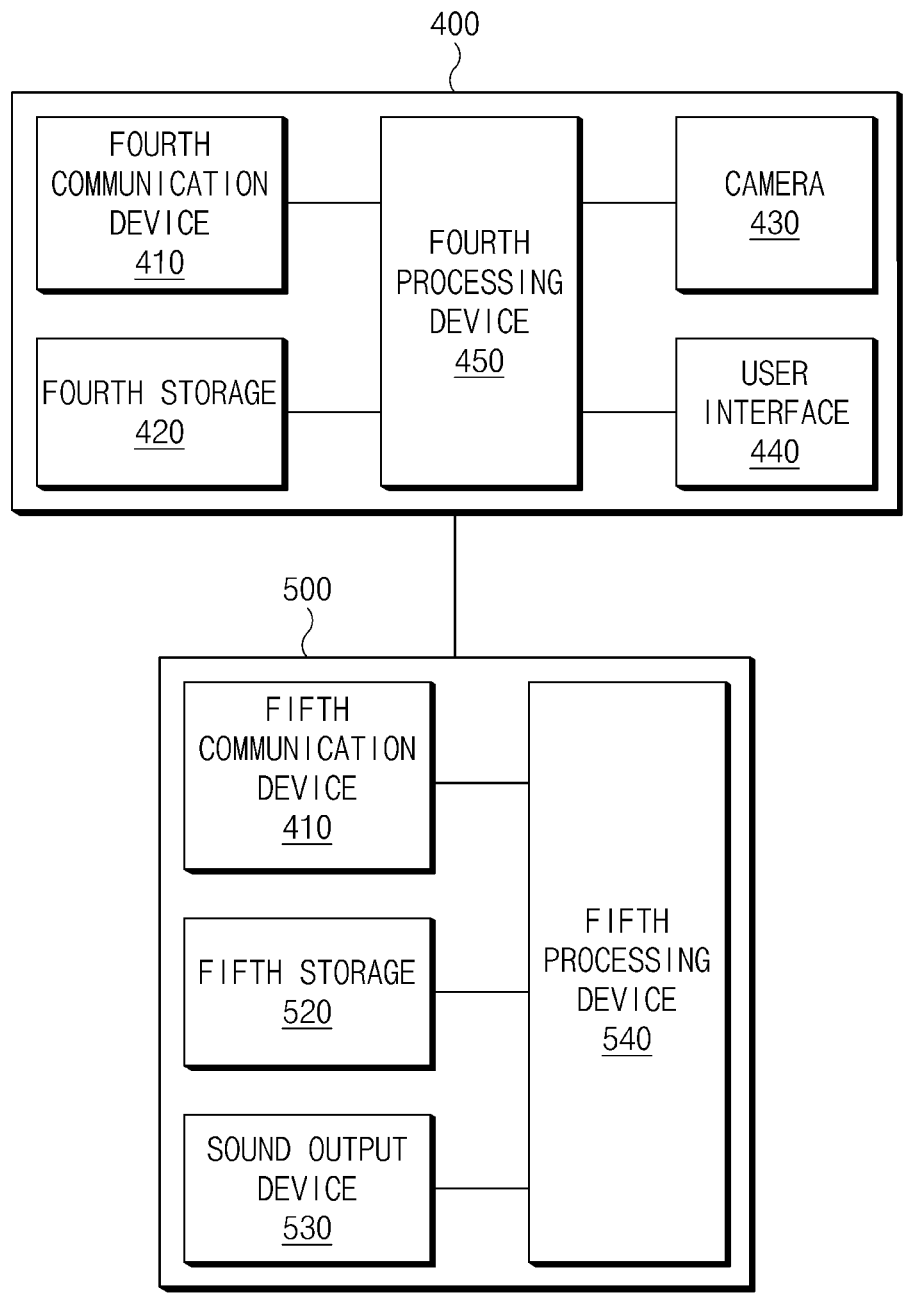
FIG. 3 is a block diagram illustrating a vehicle sound service system according to another embodiment of the present disclosure.

FIG. 3 is a block diagram illustrating a vehicle sound service system according to another embodiment of the present disclosure.

Referring to FIG. 3, the vehicle sound service system may include a mobile terminal 400 and a vehicle terminal 500.

The mobile terminal 400 may be an electronic device capable of being carried by a vehicle passenger and performing data communication, which may be a smartphone, a tablet, a laptop, and/or the like. The mobile terminal 400 may capture a driving environment using a camera 430 embedded in the mobile terminal 400 while a vehicle is traveling, may analyze the captured image to identify a driving place, and may select a sound suitable for the identified driving place. The mobile terminal 400 may include a fourth communication device 410, a fourth storage 420, a camera 430, a user interface 440, and a fourth processing device 450.

The fourth communication device 410 may be configured to support wired communication and/or wireless communication between the mobile terminal 400 and an external electronic device (e.g., the vehicle terminal 500). The fourth communication device 410 may use at least one of a wired communication technology (e.g., AUX, LAN, Ethernet, ISDN, and/or the like), and/or a wireless communication technology (e.g., Wi-Fi®, Bluetooth®, NFC, RFID, IrDA®, LTE, IMT-2000, and/or the like). The fourth communication device 410 may include a communication processor, a communication circuit, an antenna, a transceiver, and/or the like.

The fourth storage 420 may be configured to store an image captured by the camera 430. The fourth storage 420 may be configured to store data (e.g., a sound or the like) received through the fourth communication device 410. The fourth storage 420 may be a storage medium which stores instructions executed by the fourth processing device 450. The fourth storage 420 may include at least one of storage media (or recording media) such as a flash memory, a hard disk, an SSD, an SD card, a RAM, an SRAM, a ROM, a PROM, an EEPROM, an EPROM, an embedded multimedia card (eMMC), and/or a universal flash storage (UFS).

The fourth storage 420 may include a visual convolutional neural network (CNN) algorithm, an audio CNN algorithm, a score table, a sound source library, a KNN algorithm, a Kl-divergence algorithm, and/or the like. The visual CNN algorithm may be configured to extract an image feature for each place from the image and to learn the image feature for each place using image samples of various places in advance. The audio CNN algorithm may be configured to extract a sound effect feature from audio data (or a sound) and to learn the sound effect feature for each place using sound effect samples for each place in advance.

Scores for pieces of background music for each place may be defined in the score table. As hearing evaluation for each of pieces of background music is performed with respect to a plurality of targets using various background music samples for each place, the score for the background music for each place may be determined as an average of the hearing evaluation result values (or scores).

The third storage 320 may include a database which stores a sound effect feature for each place by the audio CNN and a database which stores a background music feature for each place by a hearing evaluation score table. The sound source library may be configured to store sound sources of various types of sound effects and background music.

The camera 430 may be embedded in the mobile terminal 400 to capture an image around the mobile terminal 400. The camera 430 may include at least one of image sensors such as a CCD image sensor, a CMOS image sensor, a CPD image sensor, and/or a CID image sensor. The camera 430 may include an image processor for performing noise cancellation, color reproduction, file compression, image quality adjustment, and saturation adjustment for an image obtained by the image sensor.

The user interface 440 may be a device configured for interacting with a user. The user interface 440 may include an input device (e.g., a microphone, a keyboard, a touch pad, a switch, and/or the like), an output device (e.g., a display, a speaker, a touch screen, or the like), and the like. The input device may generate data (or a signal) according to manipulation of the user. The output device may output a progress situation, a progress result, and the like according to an operation of the fourth processing unit 450 in the form of a visual signal, an audible signal, a tactile signal, and/or the like.

The fourth processing device 450 may be configured to control the overall operation of the mobile terminal 400. The fourth processing device 450 may be implemented using at least one of ASICs, DSPs, DSPDs, PLDs, FPGAs, processors, microcontrollers, or microprocessors.

While the vehicle is traveling, the fourth processing device 450 may be configured to capture an environment around the vehicle using the camera 430 embedded in the mobile terminal 400. The fourth processing device 450 may be configured to extract a feature from the captured image using the visual CNN. The fourth processing device 450 be configured to may estimate a driving place based on the extracted image feature.

The fourth processing device 450 may be configured to select a sound, that is, a sound effect and/or background music, which is matched with the estimated driving place. The fourth processing device 450 may compare the extracted image feature with a feature of the sound to select a sound most similar to the extracted image feature. The fourth processing device 450 may compare probability distributions between the extracted image feature and a sound effect feature using a KNN algorithm, a Kl-divergence algorithm, or the like and may select a sound effect having a feature most similar to a current image feature. Furthermore, the fourth processing device 450 may compare probability distributions between the extracted image feature and a background music feature using the KNN algorithm, the Kl-divergence algorithm, or the like and may select background music having a feature most similar to a current image feature.

The fourth processing device 450 may be configured to extract a sound effect and background music selected as a sound suitable for the estimated driving place from the sound source library. The fourth processing device 450 may synthesize a sound effect and background music selected based on a playback parameter (e.g., a playback interval, a playback time, a playback period, or the like) to generate a sound. The fourth processing device 450 may transmit the generated sound to the vehicle terminal 500 using the fourth communication device 410.

The vehicle terminal 500 may be an electronic device capable of being installed in the vehicle and performing data communication, which may be a navigation device, an AVNT, an infotainment device, or the like. The vehicle terminal 500 may include a fifth communication device 510, a fifth storage 520, a sound output device 530, and a fifth processing device 540.

The fifth communication device 510 may be configured to support wired communication or wireless communication between the vehicle terminal 500 and an external electronic device (e.g., the mobile terminal 400, a GNSS, and/or the like). Furthermore, the fifth communication device 510 may be configured to assist in performing communication between the vehicle terminal 500 and another electronic device (e.g., an electronic control unit (ECU) or the like) embedded in the vehicle. The fifth communication device 510 may use at least one of a vehicle communication technology (e.g., a CAN, a MOST network, a LIN, X-by-Wire, and/or the like), a wired communication technology (e.g., AUX, LAN, Ethernet, ISDN, and/or the like), and/or a wireless communication technology (e.g., Wi-Fi®, Bluetooth®, NFC, RFID, IrDA®, LTE, IMT-2000, and/or the like). The fifth communication device 510 may include a communication processor, a communication circuit, an antenna, a transceiver, and/or the like.

The fifth storage 520 may be configured to store the sound provided from the mobile terminal 400. The fifth storage 520 may be a storage medium which stores instructions executed by the fifth processing device 540. The fifth storage 520 may include at least one of storage media (or recording media) such as a flash memory, a hard disk, an SSD, an SD card, a RAM, an SRAM, a ROM, a PROM, an EEPROM, an EPROM, an embedded multimedia card (eMMC), and/or a universal flash storage (UFS).

The sound output device 530 may be configured to output the sound to the outside under control of the fifth processing device 540. The sound output device 530 may include an amplifier, a speaker, and the like. The amplifier may be embedded in the vehicle to amplify an electrical signal of the played sound. The speaker may convert the electrical signal amplified by the amplifier into a sound wave.

The fifth processing device 540 may be configured to receive the image, which is transmitted from the mobile terminal 400, through the fifth communication device 510. The fifth processing device 540 may be configured to store the received sound in the fifth storage 520. The fifth processing device 540 may be configured to play the sound to output the sound to the sound output device 530. The fifth processing device 540 may be configured to control the overall operation of the vehicle terminal 500. The fifth processing device 540 may be implemented using at least one of ASICs, DSPs, DSPDs, PLDs, FPGAs, processors, microcontrollers, or microprocessors.

Figure 4:
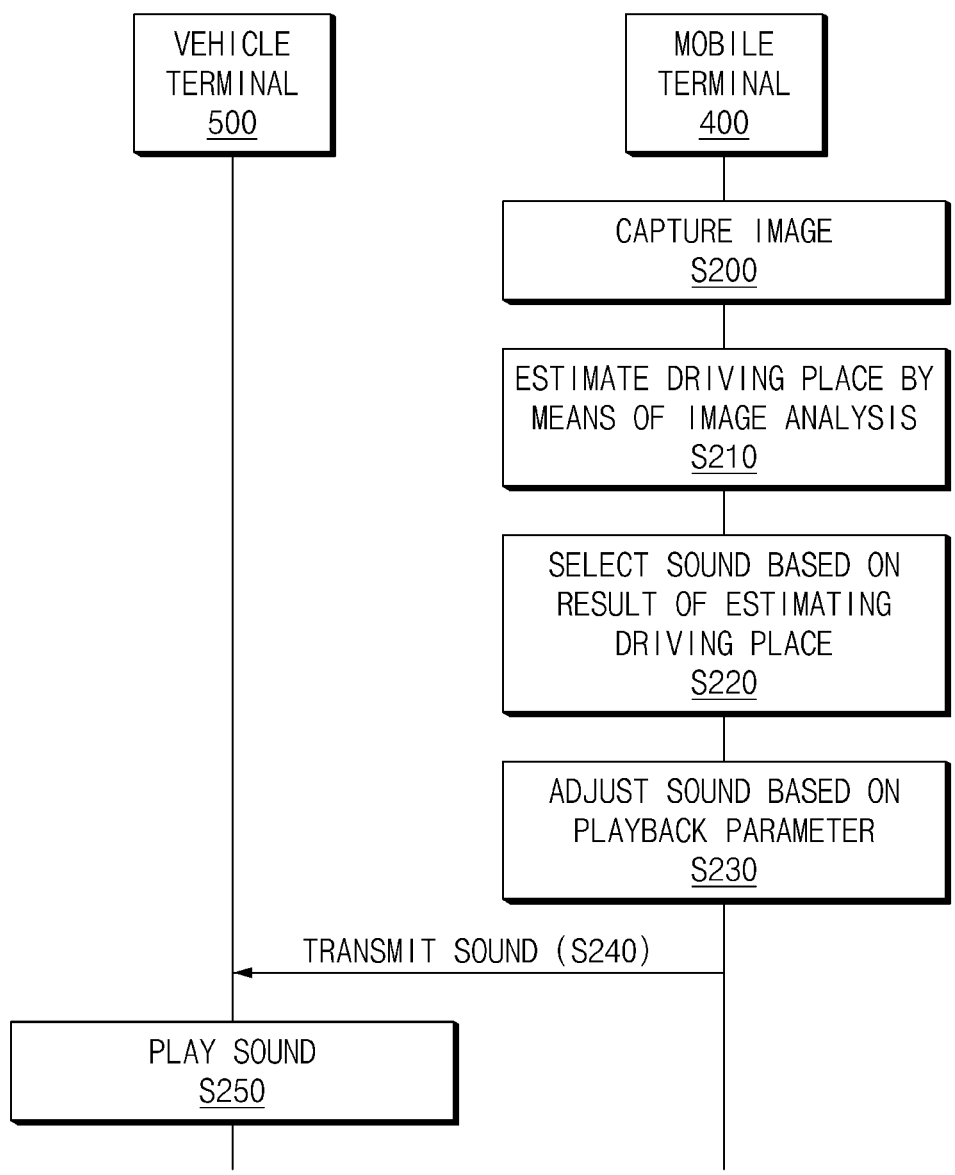
FIG. 4 is a signal sequence diagram illustrating a vehicle sound service method according to another embodiment of the present disclosure.

FIG. 4 is a signal sequence diagram illustrating a vehicle sound service method according to another embodiment of the present disclosure.

In S200, a mobile terminal 400 may be configured to capture an image around a vehicle which is traveling using a camera 430 of FIG. 3. The mobile terminal 400 embedded with the camera 430 may be in a state where it is held on the vehicle or where a passenger holds it in hand.

In S210, the mobile terminal 400 may be configured to analyze the captured image to estimate a driving place. The mobile terminal 400 may extract a feature from the image using a visual CNN algorithm. The mobile terminal 400 may estimate the driving place based on the extracted image feature.

In S220, the mobile terminal 400 may be configured to select a sound based on the result of estimating the driving place. The mobile terminal 400 may compare the extracted image feature with a feature of the sound to select a sound most similar to the extracted image feature. The mobile terminal 400 may compare probability distributions between the extracted image feature and a sound effect feature using a KNN algorithm, a Kl-divergence algorithm, or the like and may select a sound effect having a feature most similar to a current image feature. Furthermore, the mobile terminal 400 may compare probability distributions between the extracted image feature and a background music feature using the KNN algorithm, the Kl-divergence algorithm, or the like and may select background music having a feature most similar to a current image feature.

In S230, the mobile terminal 400 may be configured to adjust the sound based on a playback parameter. The mobile terminal 400 may synthesize the sound effect and the background music selected based on the playback parameter (e.g., a playback interval, a playback time, a playback period, and the like) to make up a sound.

In S240, the mobile terminal 400 may be configured to transmit the adjusted sound to a vehicle terminal 500. The mobile terminal 400 may transmit the sound composed of the selected sound effect and background music to the vehicle terminal 500.

In S250, the vehicle terminal 500 may be configured to play and output the sound provided from the mobile terminal 400. The vehicle terminal 500 may receive the sound, which is transmitted from the mobile terminal 400, through the fifth communication device 510 of FIG. 3. The vehicle terminal 500 may play and output the received sound to the sound output device 530 of FIG. 3.

Figure 5:
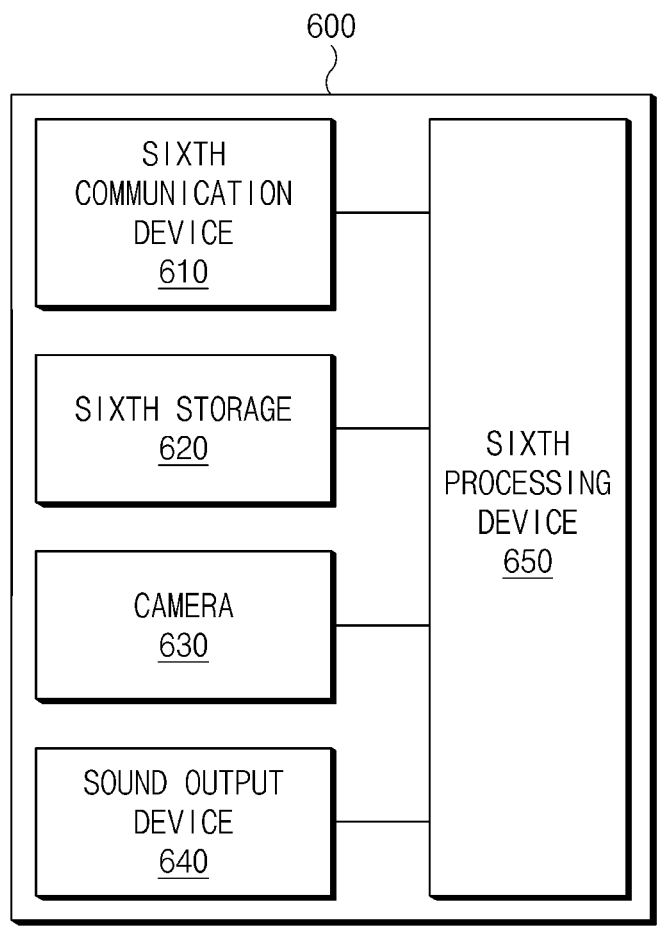
FIG. 5 is a block diagram illustrating a vehicle sound service system according to another embodiment of the present disclosure.

FIG. 5 is a block diagram illustrating a vehicle sound service system according to another embodiment of the present disclosure.

The vehicle sound service system may be implemented in a vehicle terminal 600. The vehicle terminal 600 may be an electronic device capable of being installed in a vehicle and performing data communication, which may be a navigation device, an AVNT, an infotainment device, or the like. The vehicle terminal 600 may include a sixth communication device 610, a sixth storage 620, a camera 630, a sound output device 640, and a sixth processing device 650.

The sixth communication device 610 may be configured to support wired communication or wireless communication between the vehicle terminal 600 and an external electronic device (e.g., a GNSS and/or the like). Furthermore, the sixth communication device 610 may assist in performing communication between the vehicle terminal 600 and another electronic device (e.g., an electronic control unit (ECU) or the like) embedded in the vehicle. The sixth communication device 610 may use at least one of a vehicle communication technology (e.g., a CAN, a MOST network, a LIN, X-by-Wire, and/or the like), a wired communication technology (e.g., AUX, LAN, Ethernet, ISDN, and/or the like), and/or a wireless communication technology (e.g., Wi-Fi®, Bluetooth®, NFC, RFID, IrDA®, LTE, IMT-2000, and/or the like). The sixth communication device 610 may include a communication processor, a communication circuit, an antenna, a transceiver, and/or the like.

The sixth storage 620 may be configured to store an image captured by the camera 630. The sixth storage 620 may include a visual convolutional neural network (CNN) algorithm, an audio CNN algorithm, a score table, a sound source library, a KNN algorithm, a Kl-divergence algorithm, and/or the like. The visual CNN algorithm may be configured to extract an image feature for each place from the image and may learn the image feature for each place using image samples of various places in advance. The audio CNN algorithm may also be configured to extract a sound effect feature from audio data (or a sound) and may learn the sound effect feature for each place using sound effect samples for each place in advance.

Scores for pieces of background music for each place may be defined in the score table. As hearing evaluation for each of pieces of background music is performed with respect to a plurality of targets using various background music samples for each place, the background music score for each place may be determined as an average of the hearing evaluation result values (or scores). The sixth storage 620 may include a database which stores a sound effect feature for each place by the audio CNN and a database which stores a background music feature for each place by a hearing evaluation score table. The sound source library may store sound sources of various types of sound effects and background music.

The sixth storage 620 may be a storage medium which stores instructions executed by the sixth processing device 650. The sixth storage 620 may include at least one of storage media (or recording media) such as a flash memory, a hard disk, an SSD, an SD card, a RAM, an SRAM, a ROM, a PROM, an EEPROM, an EPROM, an embedded multimedia card (eMMC), and/or a universal flash storage (UFS).

The camera 630 may be embedded in the vehicle terminal 600 to capture an image around the vehicle. The camera 630 may include at least one of image sensors such as a CCD image sensor, a CMOS image sensor, a CPD image sensor, and/or a CID image sensor. The camera 630 may include an image processor for performing noise cancellation, color reproduction, file compression, image quality adjustment, and saturation adjustment for an image obtained by the image sensor.

The sound output device 640 may be configured to output a sound to the outside. The sound output device 640 may include an amplifier, a speaker, and the like. The amplifier may be embedded in the vehicle to amplify an electrical signal of the played sound. The speaker may convert the electrical signal amplified by the amplifier into a sound wave.

The sixth processing device 650 may be configured to control the overall operation of the vehicle terminal 600. The sixth processing device 650 may be implemented using at least one of ASICs, DSPs, DSPDs, PLDs, FPGAs, processors, microcontrollers, or microprocessors.

While the vehicle is traveling, the sixth processing device 650 may be configured to capture an environment around the vehicle using the camera 630. The sixth processing device 650 may also be configured to extract a feature from the captured image using the visual CNN. The sixth processing device 650 may further be configured to estimate a driving place based on the extracted image feature.

The sixth processing device 650 may be configured to select a sound, that is, a sound effect and/or background music, which is matched with the estimated driving place. The sixth processing device 650 may compare the extracted image feature with a feature of the sound to select a sound most similar to the extracted image feature. The sixth processing device 650 may compare probability distributions between the extracted image feature and a sound effect feature using the KNN algorithm, the Kl-divergence algorithm, or the like and may select a sound effect having a feature most similar to a current image feature. Furthermore, the sixth processing device 650 may be configured to compare probability distributions between the extracted image feature and a background music feature using the KNN algorithm, the Kl-divergence algorithm, or the like and may select background music having a feature most similar to a current image feature.

The sixth processing device 650 may be configured to extract a sound effect and background music selected as a sound suitable for the estimated driving place from a sound source library. The sixth processing device 650 may also be configured to synthesize a sound effect and background music selected based on a playback parameter (e.g., a playback interval, a playback time, a playback period, or the like) to generate a sound.

The sixth processing device 650 may also be configured to play and output the generated sound to the sound output device 640. The sound output device 640 may output the played sound to the outside under control of the sixth processing device 650.

Figure 6:
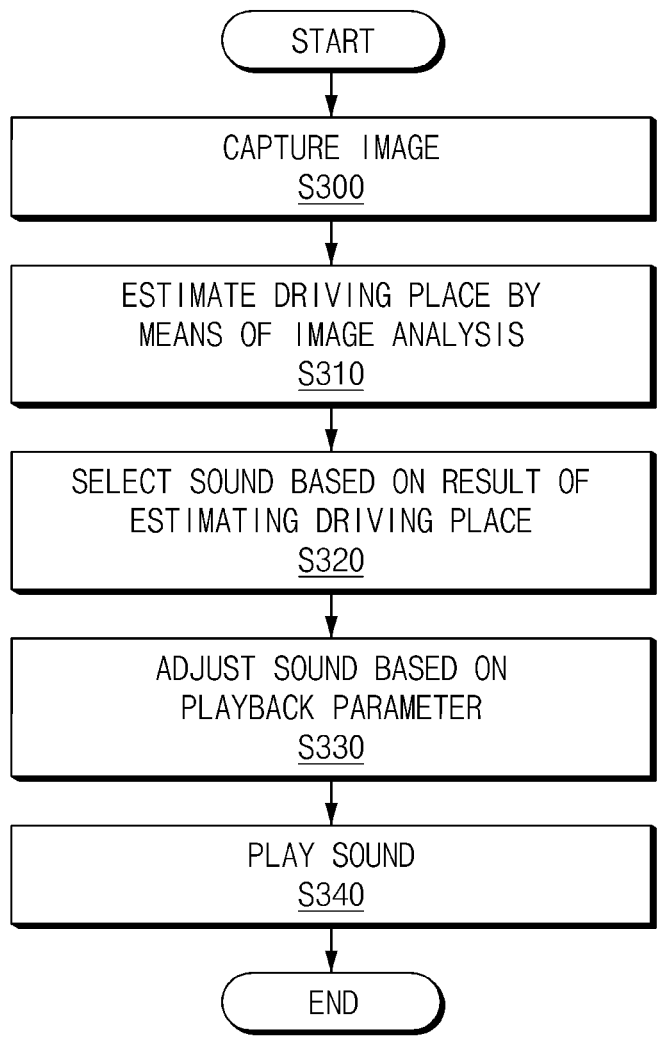
FIG. 6 is a flowchart illustrating a vehicle sound service method according to another embodiment of the present disclosure.

FIG. 6 is a flowchart illustrating a vehicle sound service method according to another embodiment of the present disclosure.

In S300, a vehicle terminal 600 of FIG. 5 may capture an image around a vehicle which is traveling using a camera 630 of FIG. 5. The camera 630 may be held or mounted on the vehicle.

In S310, the vehicle terminal 600 may analyze the image captured by the camera 630 to estimate a driving place. The vehicle terminal 600 may extract a feature from the image using a visual CNN algorithm. The vehicle terminal 600 may estimate the driving place based on the extracted image feature.

In S320, the vehicle terminal 600 may select a sound based on the result of estimating the driving place. The vehicle terminal 600 may compare the extracted image feature with a feature of the sound to select a sound most similar to the extracted image feature. The vehicle terminal 600 may compare probability distributions between the extracted image feature and a sound effect feature using a KNN algorithm, a Kl-divergence algorithm, or the like and may select a sound effect having a feature most similar to a current image feature. Furthermore, the mobile terminal 600 may compare probability distributions between the extracted image feature and a background music feature using the KNN algorithm, the Kl-divergence algorithm, or the like and may select background music having a feature most similar to a current image feature.

In S330, the vehicle terminal 600 may adjust the sound based on a playback parameter. The vehicle terminal 600 may synthesize a sound effect and background music selected based on the playback parameter (e.g., a playback interval, a playback time, a playback period, and the like) to generate a sound.

In S340, the vehicle terminal 600 may play and output the adjusted sound. The vehicle terminal 600 may play and output the sound composed of the sound effect and the background music to the sound output device 640 of FIG. 5.

According to embodiments of the present disclosure, the vehicle sound service system may capture an environment around the vehicle using a camera of a mobile terminal while the vehicle is traveling, may analyze the capture image, and may provide the vehicle with a sound suitable for the environment, thus providing a pleasant hearing experience to vehicle passengers.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present invention are not intended to limit the technical spirit of the present invention, but provided only for the illustrative purpose. The scope of the present disclosure should be construed on the basis of the accompanying claims, and all the technical ideas within the scope equivalent to the claims should be included in the scope of the present disclosure.

What is claimed is:

1. A vehicle sound service system, comprising:
a service server configured to include a communication device configured to transmit and receive data with a mobile terminal embedded with a camera and a processing device electrically connected with the communication device,
wherein the processing device is configured to:
when the mobile terminal captures an image around a vehicle using the camera and transmits the image, receive the image transmitted from the mobile terminal using the communication device,
analyze the received image to estimate a driving place, including extracting an image feature from the received image,
select a sound that matches the estimated driving place, including:
storing a feature of a sound effect for each place by hearing evaluation in a database in advance,
comparing probability distributions between the extracted image feature and the feature of the sound effect stored in the database, and
selecting the sound effect having the feature most similar to the extracted image feature based on the compared result, and
transmit the selected sound to the mobile terminal.

2. The vehicle sound service system of claim 1, wherein the processing device is configured to extract the image feature from the received image using a visual convolutional neural network (CNN).

3. The vehicle sound service system of claim 2, wherein the processing device is configured to allow the visual CNN to learn an image feature for each place using image samples for each place in advance.

4. The vehicle sound service system of claim 2, wherein the processing device is configured to compare probability distributions between the extracted image feature and the feature of the sound effect using a K nearest neighbor (KNN) algorithm or a Kullback-Leibler (Kl)-divergence algorithm.

5. The vehicle sound service system of claim 4, wherein the processing device is configured to store a sound effect feature for each place by an audio CNN in the database in advance.

6. The vehicle sound service system of claim 4, wherein the processing device is configured to compare probability distributions between the extracted image feature and a feature of background music stored in the database using the KNN algorithm or the Kl-divergence algorithm and to select background music having a feature most similar to the extracted image feature based on the compared result.

7. The vehicle sound service system of claim 1, wherein the processing device is configured to adjust a sound selected based on a playback parameter and to transmit the adjusted sound to the mobile terminal.

8. The vehicle sound service system of claim 7, wherein the playback parameter includes at least one of a playback interval, a playback time, or a playback period.

9. The vehicle sound service system of claim 7, wherein the mobile terminal is configured to transmit the adjusted sound to a vehicle terminal such that the vehicle terminal plays and outputs the adjusted sound to the outside.

10. A vehicle sound service method, comprising:
capturing, by a mobile terminal, an image around a vehicle using a camera embedded in the mobile terminal and transmitting, by the mobile terminal, the image;
receiving, by a processing device of a service server, the image transmitted from the mobile terminal using a communication device of service server;
analyzing, by a processing device, the received image to estimate a driving place;
selecting, by the processing device, a sound that matches the estimated driving place; and
transmitting, by the processing device, the selected sound to the mobile terminal;
wherein the estimating of the driving place includes extracting, by the processing unit, an image feature from the received image, and
wherein the selecting of the sound includes:
storing, by the processing device, a feature of a sound effect for each place by hearing evaluation in a database in advance, comparing, by the processing device, probability distributions between the extracted image feature with the feature of a-the sound effect stored in the database, and selecting, by the processing device, a-the sound effect having the feature most similar to the extracted image feature based on the compared result.

11. The vehicle sound service method of claim 10, wherein the estimating of the driving place includes extracting, by the processing unit, the image feature from the received image using a visual convolutional neural network (CNN).

12. The vehicle sound service method of claim 11, further comprising allowing, by the processing unit, the visual CNN to learn an image feature for each driving place using image samples for each driving place in advance.

13. The vehicle sound service method of claim 11, wherein the selecting of the sound includes comparing, by the processing device, probability distributions between the extracted image feature with the feature of the sound effect stored in the database using a K nearest neighbor (KNN) algorithm or a Kullback-Leibler (Kl)-divergence algorithm.

14. The vehicle sound service method of claim 13, further comprising storing, by the processing device, a sound effect feature for each driving place by an audio CNN in the database in advance.

15. The vehicle sound service method of claim 13, wherein the selecting of the sound includes comparing, by the processing device, probability distributions between the extracted image feature with a feature of background music stored in the database using the KNN algorithm or the Kl-divergence algorithm and selecting, by the processing device, background music having a feature most similar to the extracted image feature based on the compared result.

16. The vehicle sound service method of claim 10, wherein the transmitting of the selected sound to the mobile terminal includes:

adjusting, by the processing device, the selected sound based on a playback parameter; and transmitting, by the processing device, the adjusted sound to the mobile terminal.

17. The vehicle sound service method of claim 16, wherein the playback parameter includes at least one of a playback interval, a playback time, or a playback period.

18. The vehicle sound service method of claim 16, further comprising:

receiving and transmitting, by the mobile terminal, the adjusted sound to a vehicle terminal; and playing and outputting, by the vehicle terminal, the adjusted sound to the outside.

* * * * *